United States Patent [19]
Krick et al.

[11] Patent Number: 6,014,742
[45] Date of Patent: Jan. 11, 2000

[54] TRACE BRANCH PREDICTION UNIT

[75] Inventors: Robert Franklin Krick, Beaverton; Chan Woo Lee; Reynold Viriato D'Sa, both of Portland, all of Oreg.

[73] Assignee: Intel Corporation, Santa Clara, Calif.

[21] Appl. No.: 09/002,166

[22] Filed: Dec. 31, 1997

[51] Int. Cl.$^7$ ........................................ G06F 9/38
[52] U.S. Cl. ................ 712/236; 712/233; 712/238; 712/239; 712/240
[58] Field of Search .................. 712/236, 237, 712/238, 239, 240, 233

[56] References Cited

U.S. PATENT DOCUMENTS

| | | | |
|---|---|---|---|
| 5,381,533 | 1/1995 | Peleg et al. | 712/215 |
| 5,742,804 | 4/1998 | Yeh et al. | 712/237 |

OTHER PUBLICATIONS

Dutta et al., "Control Flow Prediction with Tree like Sudgraphs for Superscalar Processors", Proceedings of the 28th Annual International Symposium on Microarchitecture, 1995, IEEE, pp. 258–263, Nov. 29–Dec. 1, 1995.

Patt et al., "One Billion Transistors, One Uniprocessor, One Chip", *Computer*, IEEE, vol. 30, iss. 9, pp. 51–57, Sep. 1997.

Jacobsen et al., "Path–based Next Trace Prediction", Proceedings of Thirtieth Annual IEEE/ACM Symposium on Microarchitecture, pp. 14–23, Dec. 1–3, 1997.

Jacobsen et al., "Control Flow Speculation in Multiscalar Processors", Third International Symposium on High–Performance Computer Architecture, IEEE, pp. 218–229, Feb. 1–5, 1997.

Rotenberg et al., "Trace Cache: A Low Latency Approach to High Bandwidth Instruction Fetching", Proceedings of the 29th Annual IEEE/ACM International Symposium on Microarchitecture, Dec. 2–4, 1996.

*Primary Examiner*—W. Treat
*Attorney, Agent, or Firm*—Kenyon & Kenyon

[57] ABSTRACT

A trace branch prediction unit includes a trace branch target buffer connected to a trace cache. The trace cache stores traces of micro-ops, with the micro-ops being stored non-sequentially. The trace branch target buffer generally reads a buffer entry corresponding to a particular trace line one clock cycle before the trace line is read to a processor. Using the entry, the trace branch target buffer predicts whether the trace cache should follow the existing trace or leave the trace. If the trace branch target buffer predicts that the trace cache should leave a trace, the trace branch target buffer provides a target address for a new trace. The trace branch target buffer also predicts when a trace is ending and provides a target address for the next trace.

26 Claims, 12 Drawing Sheets

| Time | Trace Cache | Trace BTB |
|---|---|---|
| $t_0$ | request to read trace | ----- |
| $t_1$ | read TBTB entry for x | [read x]<br>read x + 1<br>begin x+1 prediction |
| $t_2$ | read TBTB entry for x + 1 | predict x + 1<br>read x+2<br>begin x+2 prediction |
| $t_3$ | read TBTB entry for x + 2 | predict x+2<br>read x+3<br>begin x+3 prediction |

Figure 3

|  | Build Prediction | | |
|---|---|---|---|
|  | Taken | Not Taken | Missing |
| Computed Prediction: Taken | Not Trace Leave | Trace Leave | Not Trace Leave |
| Computed Prediction: Not Taken | Trace Leave | Not Trace Leave | Not Trace Leave |

FIGURE 5

TRACE BRANCH PREDICTION UNIT

FIELD OF THE INVENTION

The present invention relates to branch prediction in a trace cache. In particular, the present invention relates to a method and apparatus for predicting multiple branches in a trace cache.

BACKGROUND OF THE INVENTION

In a computer system, a cache stores data in order to decrease data retrieval times for a processor. More particularly, a cache stores specific subsets of data in high-speed memory. When a processor requests a piece of data, the system checks the cache first to see if the data is stored within the cache. If it is available, the processor can retrieve the data much faster than if the data was stored in other computer readable media such as random access memory, a hard drive, CD ROM or floppy disk.

One particular type of cache is referred to as a trace cache. A trace cache is responsible for building, caching, and delivering instruction traces to a processor. In one type of trace cache, instructions are stored as "traces" of decoded micro-operations or "micro-ops", and are only allowed to be accessed in units of "traces." Traces are blocks of micro-op instructions that are distinguishable from one another only by their trace heads. Generally, traces may be terminated upon encountering an indirect branch or by reaching one of many preset threshold conditions, such as the number of conditional branches in the trace or the number of total micro-ops in the trace.

A problem associated with the trace cache is branch prediction. It can be appreciated that some micro-ops contain conditional branches to determine whether an algorithm should perform one set of instructions under certain conditions and another set of instructions under a different set of conditions. To minimize processing cycles, modem central processing units (CPU), such as Pentium™ and Pentium Pro™ microprocessors produced by Intel, attempt to predict the targets of branches in instructions. If the CPU mispredicts which target is selected, the CPU must utilize extra CPU cycles to correct the misprediction. This is referred to as a branch misprediction penalty. Because of the structure of the trace cache, the problem of branch predictions is aggravated over conventional systems.

SUMMARY OF THE INVENTION

An embodiment of the present invention provides a branch target buffer for a trace cache including a target buffer array which stores TBTB entries. The target buffer data path receives a TBTB entry that corresponds to at least one micro-op contained in the trace cache and contains information about a branch in the at least one micro-op, and uses the TBTB entry to predict one of a Trace Leave and a Not Trace Leave for the branch.

An embodiment of a method according to the present invention includes looking up a first TBTB entry corresponding to a first branching micro-op of a selected trace line and predicting one of a Trace Leave and a Not Trace Leave for the first branching micro-op using the first TBTB entry.

BRIEF DESCRIPTION OF THE DRAWINGS

FIG. 3 is an exemplary time line for actions within an exemplary trace cache unit according to the present invention.

FIG. 5 is a schematic matrix of exemplary predictions of an embodiment of a trace cache unit according to the present invention.

DETAILED DESCRIPTION

Figure 1:
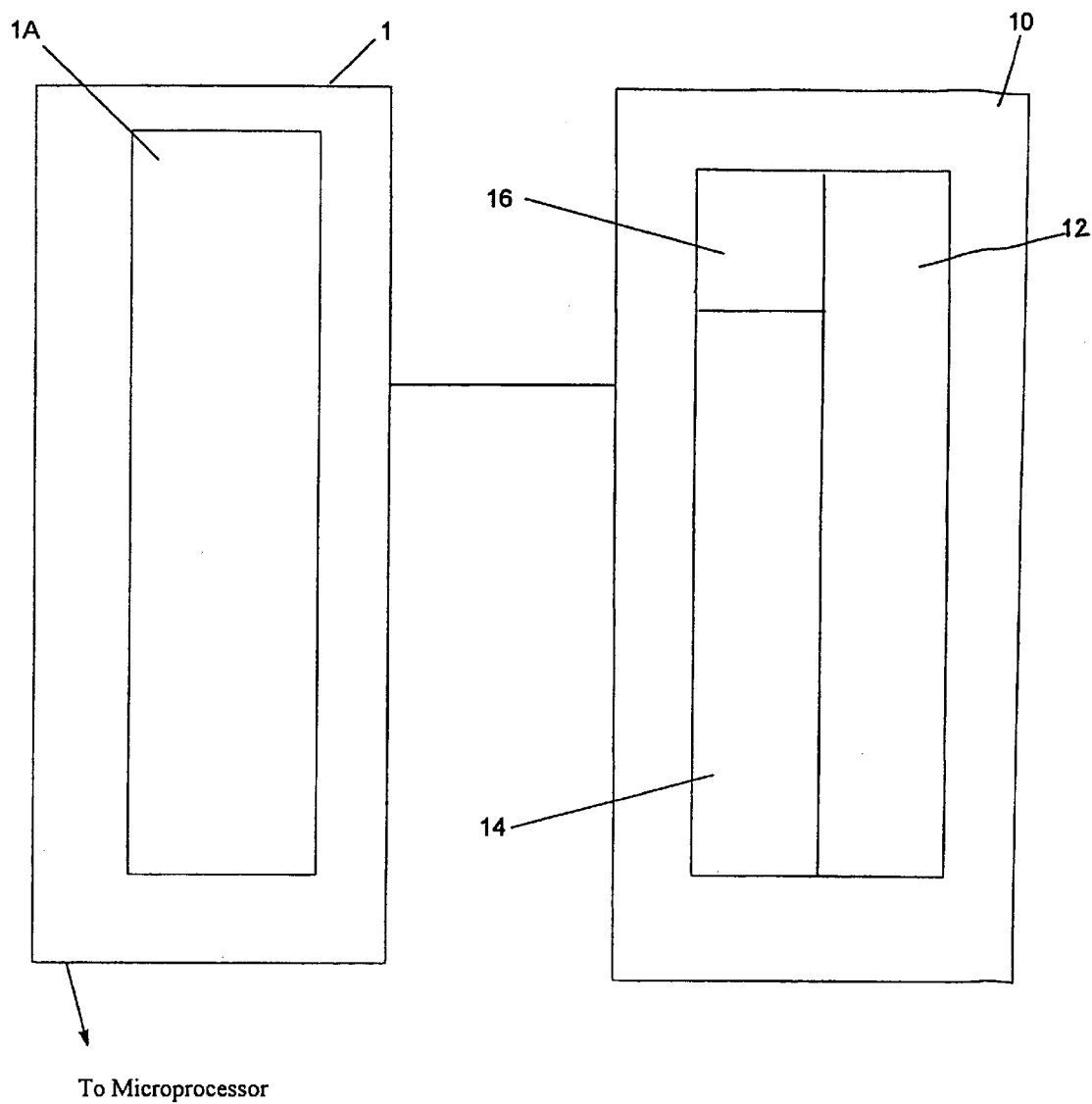
FIG. 1 is a schematic view of an embodiment of a trace cache unit according to the present invention.

FIG. 1 illustrates a trace cache unit having a trace branch target buffer according to an embodiment of the present invention. The unit includes a trace cache 1 connected to a trace branch target buffer ("TBTB") 10. The trace cache 1 includes, for example, a trace cache array 1A. An embodiment of the TBTB 10 includes a TBTB data path 12 and a TBTB array 14. The exemplary TBTB 10 may also include a head TBTB 16, as discussed below.

The trace cache 1 is responsible for building instruction traces for use by the processor and sending those instruction traces to the processor. In an embodiment of the present invention, an instruction trace is essentially a series of macro instructions, each of which is broken down, for example, into micro-operations ("micro-ops"), which are basic steps taken by the processor to perform processing functions. Instructions are typically stored in some form of system memory in sequential addresses. This linear sequence, however, is not followed by the processor in many circumstances. Rather, the processor will perform, for example, a series of non-sequential instructions to compute a certain result, jumping from place to place in system memory to obtain the desired instructions. In an embodiment of the trace cache 1, this non-sequential series of instructions may be, for example, broken down into micro-ops, grouped together, and stored for future use by the processor, either after an initial use by the processor or simply in anticipation of use by the processor.

A trace built by the trace cache 1 may include some micro-ops that contain branches. Some of these branches may be assumed to be "taken" as the trace is built, while others are "not taken." In other words, the series of micro-ops forming the trace may include a jump from one instruction in system memory to another instruction in system memory. That jump may be the result of a branch being taken in the first instruction. In the resulting trace, the two micro-ops corresponding to these instructions are stored continuously, despite the fact that the instructions are not in sequential addresses in system memory, because the jump (the branch) is built into the trace. In this case, the branch is assumed to be in a "taken" state as the branch is built.

In other cases, the series of micro-ops to be performed by the processor includes a branch that is not taken. In this situation, the branch appearing in the trace is assumed to be not taken in the trace. This information is also recorded as the trace is built in the trace cache 1, so that the fact that the branch was not taken in the building of the trace is reflected in the trace itself. In this case, the corresponding micro-ops will be in the same sequence as the corresponding instructions in the system memory.

Essentially, micro-ops to be performed may be stored sequentially in the trace cache 1 in the order that they are performed, despite the fact that the corresponding instructions are not stored in sequential addresses in system memory. When this series of micro-ops includes a branch, the path traveled from the branching micro-op to the next micro-op is stored, for example, within the trace cache 1 along with the micro-ops themselves. The "path" can be thought of as either taken (i.e. branching away from the sequence of macro instructions as stored in memory) or not taken.

Thus the trace cache 1 stores, for example, groups of micro-ops known as traces, which are expected to be used in the future by the processor. However, just as the processor often executes instructions in a "non-sequential" fashion as described above, the processor often performs micro-ops in a different order than they appear in traces. In addition, other factors or conditions may require that the processor leave a trace that it has been performing. Generally, if the processor, while performing a trace, is unaware that it must leave a trace, then the transition from one trace to a new trace may take one or more extra clock cycles. From another perspective, as the trace cache 1 reads out a trace to a processor, it will waste clock cycles when it stops reading one trace and begins reading another, unless it has some advance notice of the fact that it is leaving a trace and notice of the target address of a new trace.

An embodiment of the present invention shown in FIG. 1 includes a TBTB 10. The TBTB 10 is responsible, for example, for reading and analyzing TBTB entries associated with the traces to be sent to a processor and making several predictions, which are outlined here and discussed in detail below. First, the TBTB 10 predicts, for example, when the processor will follow a different path than the path built into the trace. If so, the TBTB 10 also predicts the target address of a new trace to be read out, for example, by the trace cache 1. Finally, the TBTB 10 predicts the end of a trace being read out from the trace cache 1, and predicts a target address for a new trace to be read out. In an exemplary embodiment, the TBTB 10 makes each prediction in time for the trace cache 1 to follow the prediction in a minimum number of clock cycles. These functions are generally controlled, for example, by the TBTB data path 12, which may serve as the control block for the TBTB 10 processes.

To make its predictions, the TBTB 10 also stores, for example, the taken/not taken predictions determined when the trace was built. These predictions may be termed "historical predictions," "build predictions," or simply "historical data," and may be stored in the TBTB array 14 as discussed below. The TBTB 10 then computes, for example, a new "computed prediction" and compares the computed prediction to the historical prediction. The TBTB's ultimate prediction is based, for example, on this comparison. If the historical and computed predictions match, the TBTB 10 predicts, for example, a "Not Trace Leave" (discussed below). In this case, the trace cache 1 may continue, for example, to transmit the current trace. If the predictions differ, however, the TBTB 10 may notify the trace cache 1 by predicting, for example, a "Trace Leave" (also discussed below). In this case, the TBTB 10 may also provide a target address for a new trace.

Many branch prediction schemes may be used to compute the computed prediction of "taken" or "not taken," and any suitable scheme will suffice for purposes of the present invention. In an exemplary embodiment, the TBTB 10 may store particular entries, or "TBTB entries," associated with the trace lines in, for example, the TBTB array 14. The TBTB 10 may then make its computed prediction based upon a TBTB entry associated with a trace line, using any suitable algorithm.

The TBTB entries include, for example, information related to the existence of branches within each trace line. In an exemplary embodiment, the TBTB 10 stores entries only for those branching micro-ops for which the build prediction is incorrect. In other words, on the first occasion that a trace is read to a processor, the TBTB 10 contains no TBTB entry associated with the trace. Only upon determining that a branch has been mispredicted within the trace (e.g. a branch built as a "not taken" branch is actually "taken" by the processor when the trace is executed), does the exemplary embodiment of the TBTB 10 build a TBTB entry associated with the branch. Then when the trace is later read, the TBTB entry will be available to potentially predict a Trace Leave. This exemplary embodiment allows the TBTB array 14 to be, for example, substantially smaller than the trace cache array 1A.

The TBTB entries themselves may contain any suitable data. In an exemplary embodiment, the TBTB entries include a tag (for indexing purposes), a micro-op number to designate where a branch exists, a target address, and the associated build prediction for comparison purposes.

Figure 2:
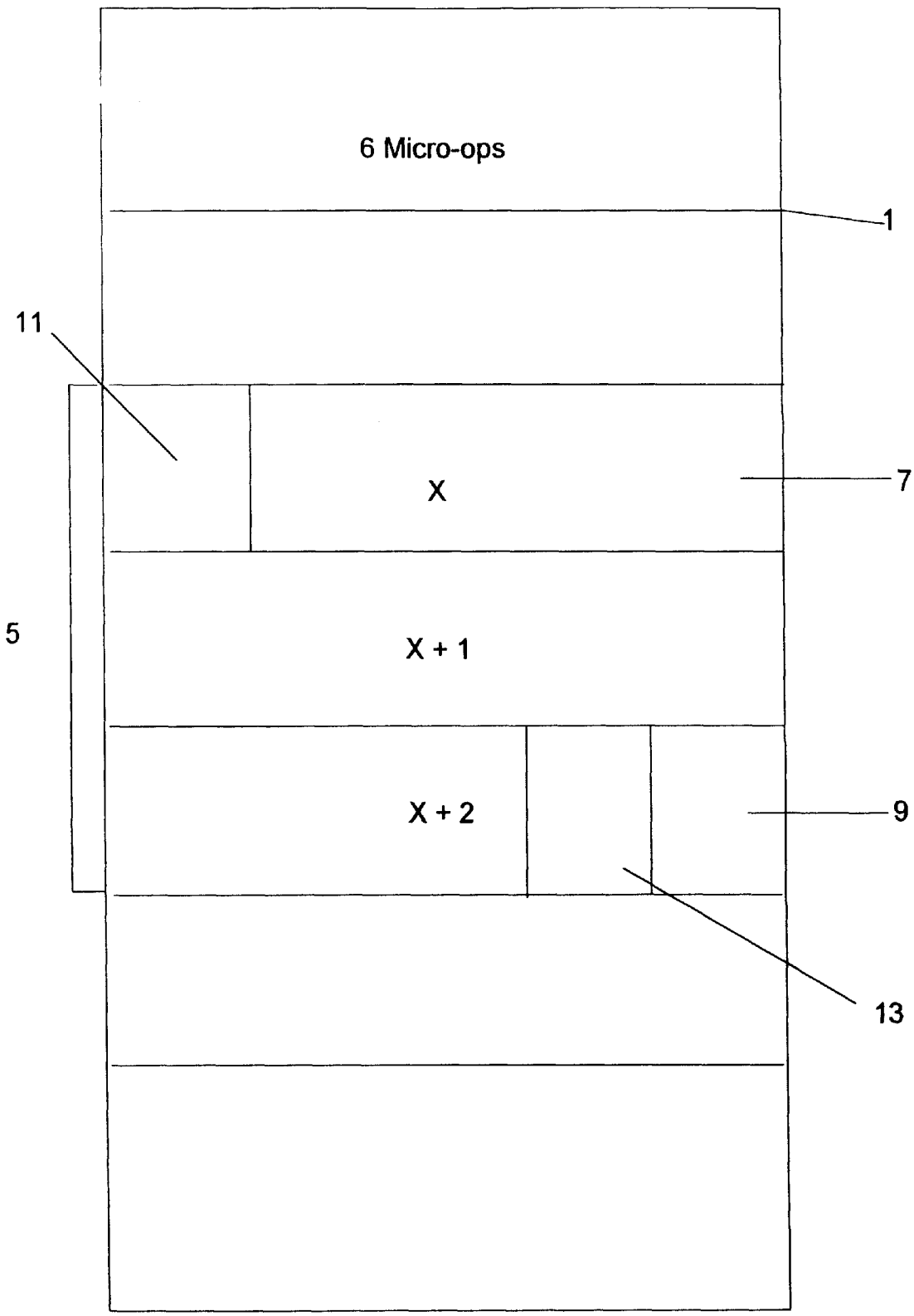
FIG. 2 is a schematic view of an embodiment of a trace cache according to the present invention.

FIG. 2 illustrates an exemplary embodiment of the trace cache 1. In the trace cache 1, instructions are stored as traces of micro-ops. In an exemplary embodiment, each of the traces is subdivided into one or more trace lines. In the embodiment of a trace cache shown in FIG. 2, each trace line of the trace cache 1 may include, for example, up to 6 micro-ops.

The trace cache 1 transmits, for example, one trace line to the processor per clock cycle. Thus the trace cache 1 transmits, for example, up to six micro-ops to the processor during each clock cycle. Accordingly, the exemplary TBTB 10 must make its predictions on the micro-ops of one trace line per clock cycle (up to six micro-ops in the exemplary embodiment). As discussed more fully below, the TBTB 10 may require, for example, two clock cycles to perform its various functions if sophisticated prediction algorithms are to be used. Therefore, the TBTB 10 reads the TBTB entry related to each trace line and begins its prediction one clock cycle before the trace cache 1 reads the trace line to the processor. In this manner, the TBTB 10 may complete its predictions for a particular trace line before the trace cache 1 begins to read the following line of the trace.

An exemplary trace 5 is also illustrated in FIG. 2. The trace 5 includes a first line 7 and a last line 9. In the exemplary trace 5 shown in FIG. 2, the first line 7 of the trace 5 is designated x and the last line 9 of the trace 5 is designated x+2, with an intermediate trace line x+1 forming the remaining (interior) portion of the trace 5. The trace 5 also includes a trace head 11 contained in the first line 7 of the trace 5. The first macro instruction in the trace 5 is tagged, for example, as the trace head 11. The trace lines are stored, for example, sequentially within a trace 5 and read out to the processor in that order. In other words, when for example the trace 5 of FIG. 2 is read out, trace line x will be read first, followed by line x+1, and then line x+2.

Because the micro-ops stored in the trace cache 1 are not necessarily from instructions having sequential memory addresses, the TBTB 10 need not be linearly addressed like most conventional caches. That is, the TBTB 10 need not be indexed based upon instruction pointers ("IPs") which are normally used to access the macro instructions in a conventional instruction cache. Instead, information stored in the TBTB 10 is indexed according to, for example, the trace head 11 of the trace 5 containing the corresponding micro-op. More specifically, the branch information stored in the TBTB 10 of any micro-op is indexed according to the trace head 11 of the micro-op and the distance of the micro-op from the trace head 11. This exemplary indexing arrangement allows the TBTB 10 to properly index branch information even for multiple copies of the same branch contained within the trace cache 1.

As noted above, the TBTB 10 predicts, for example, when the trace cache 1 needs to jump from one trace of instructions to another trace of instructions. Specifically, the TBTB 10 predicts (1) when the trace cache 1 will leave an existing trace 5 due to the outcome of a branch and (2) when the trace cache 1 will leave a trace 5 because the trace is ending. In addition, the TBTB 10 predicts, for example, the target address of the trace head 11 of the next trace 5 that the trace cache 1 will read out to the processor. In an exemplary embodiment, the TBTB 10 reads any TBTB entries for a trace line of a trace 5 and makes predictions on the micro-ops of the trace line. Preferably, the TBTB 10 makes its predictions before the next trace line is read from the trace cache 1 to the processor.

In an exemplary embodiment, the TBTB prediction requires, for example, two clock cycles. This allows the TBTB 10 to employ a more sophisticated algorithm to obtain effective branch prediction. The TBTB 10 may employ, for example, any known branch prediction algorithm, for example Yeh's algorithm. While the prediction requires, for example, two clock cycles, in an exemplary embodiment of the present invention only one clock cycle is required to read a trace line to the processor. Accordingly, in order to achieve optimal throughput between the TBTB 10 and the trace cache 1 (i.e., in order to obtain the branch prediction from the TBTB 10 on a trace line before the trace cache 1 begins to read the next trace line), each TBTB entry is read by the TBTB 10 a clock cycle before the corresponding trace line is read out to the processor.

FIG. 3 illustrates an exemplary time line for this process. At time t0 the trace cache receives a request to read a certain trace 5. At time t1 the trace cache 1 begins to read that trace 5 to the processor, beginning with the first line 7 of that trace x. At the same time, the TBTB 10 reads the TBTB entry associated with line x+1, the next line of the trace 5, and begins its prediction on trace line x+1. The TBTB entry for trace line x may also be read to the TBTB 10 at this time, as discussed below. At time t2, the trace cache 10 begins its read of trace line x+1 to the processor. Also, at time t2 the TBTB 10 reads the TBTB entry for line x+2 of the trace 5 and begins its prediction on line x+2. Finally, the TBTB 10, also in time t2, completes its prediction on line x+1, so that if the TBTB 10 predicts a Trace Leave for line x+1, the TBTB 10 may send the trace cache 1 a target address for a new trace 5 to be read out before the trace cache 1 begins to read line x+2.

Assuming that the TBTB 10 does not predict a Trace Leave for line x+1, the trace cache 1 reads, in time t3, the next sequential trace line x+2 to the processor. Also during time t3, the TBTB 10 (1) reads the TBTB entry for line x+3 (not present in the exemplary trace of FIG. 2) and begins its prediction on that line and (2) completes its prediction on line x+2. If the TBTB 10 predicts a Trace Leave for line x+2, it may send the trace cache 1 a target address for the next trace 5 to be read before the trace cache 1 reads line x+3.

Thus, in each clock cycle, the trace cache 1 reads out a trace line of a trace 5, the trace line containing up to six micro-ops. During the same clock cycle, the TBTB 10 performs two functions. First, the TBTB 10 makes a prediction on the trace line that the trace cache 1 reads out to the processor in that clock cycle. For the TBTB 10, this completes a process which began, for example, one clock cycle ago, when it read the TBTB entry for the trace line now being shipped by the trace cache 1. Second, the TBTB 10 reads any TBTB entries for the following trace line and begins its branch prediction on that trace line. This pipelined sequence continues until a Trace Leave is predicted by the TBTB 10 or until the trace cache 1 reads out the last line 9 of the trace 5.

When the TBTB 10 reads the TBTB entry corresponding to the last line 9 of a trace 5, then a Trace End, for example, is predicted and a target address for a next trace 5 is sent to the trace cache 1. The next trace 5 may be a new trace or the same trace being read out. As with the Trace Leave prediction described above, this prediction requires, for example, two clock cycles. However, because the TBTB 10 reads the TBTB entry for the last line 9 one clock cycle prior to the when the trace cache 1 reads out the last line 9, the Trace Leave prediction is completed in time for the trace cache 1 to begin reading the next trace 5 without wasting any extra clock cycles. The target address for the new trace 5 is stored, for example, within the last line 9 of the trace 5 (in case there is no prediction).

It can be understood that, like the Trace Leave prediction, the Trace End prediction may be based upon a TBTB entry stored in the TBTB 10. In an exemplary embodiment, TBTB entries exist, for example, for every last line 9 of the traces 5 stored by the trace cache 1. These TBTB entries may be built at any suitable time, for example when the trace retires after its initial execution by the processor (i.e. just after the trace itself is first built).

Figure 4A:
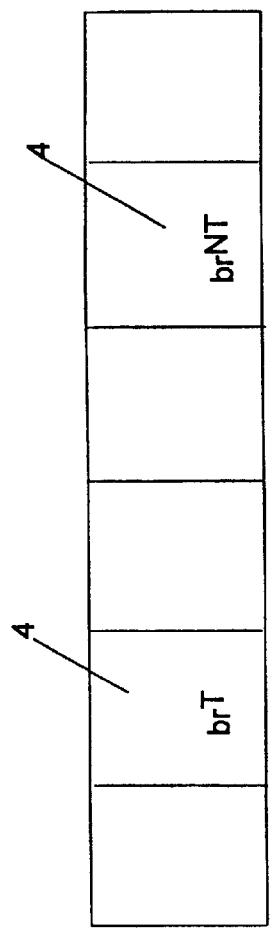
FIGS. 4A and 4B are schematic views of trace cache data in an exemplary embodiment of the present invention.
Figure 4B:
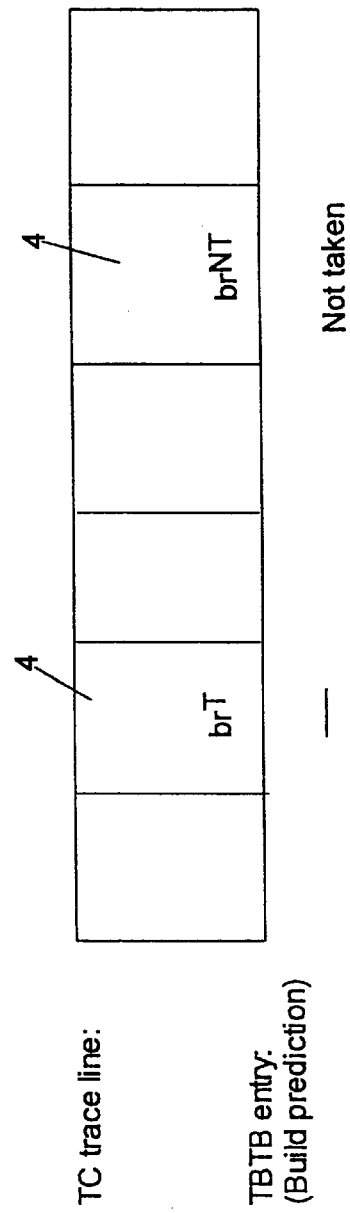

FIGS. 4A and 4B show the contents of the trace cache 1 and the TBTB 10 in greater detail. It can be understood by one skilled in the art that in conventional branch prediction systems, the system typically predicts a "taken" or a "not taken" path for each branch 4. As noted above, an embodiment of the present invention predicts instead a Trace Leave or a Not Trace Leave path for each branch 4.

In one exemplary embodiment of the present invention, this may be accomplished, for example, by recording historical data for Trace Leave and Not Trace Leave for each branch 4 of a trace that has previously been followed, and then predicting a Trace Leave or Not Trace Leave depending upon the historical data.

Another embodiment of the present invention, however, utilizes the approach introduced above to determine Trace Leave or Not Trace Leave for each branch 4. In this approach, each of the micro-ops having a branch 4 includes, for example, an assumed taken or not taken path for the branch 4. As described above, this path represents the path taken at a branch 4 as one travels from micro-op to micro-op within the trace. The internal path of the trace 5 thus includes taken or not taken branches 4 that link the non-sequential micro-ops of the trace 5. This internal path is stored, for example, with the branch 4 in the trace cache 1. In other words, with regard to FIGS. 4A and 4B, it can be seen that each branch 4 of the trace line may be stored in a taken or not taken state. This stored taken or not taken state may also stored, for example, in the TBTB 10 as part of a TBTB entry for the trace line if such an entry is built. The taken or not taken state drawn from the trace cache 1 may be labeled, for example, the "build prediction" for the branch 4. As noted above, in an exemplary embodiment of the TBTB 10, there need not be a build prediction or entry in the TBTB 10 for each branch 4 of the trace cache 1. Rather, build predictions for selected branches 4 may be omitted, or missing, from the TBTB 10 when no associated entry has been built by the TBTB 10. This situation is illustrated in FIG. 4B.

In order to generate the Trace Leave or Not Trace Leave prediction for each branch 4, an exemplary embodiment of the TBTB 10, after reading the TBTB entry for a particular trace line, computes a "computed prediction" of taken or not taken for each branch 4 contained within the trace line. If this computed prediction matches the build prediction (i.e. the historical data), then a Not Trace Leave is predicted by the TBTB 10. Conversely, if the build prediction does not match the computed prediction for the branch 4, a Trace Leave is predicted for the branch 4. In situations where build predictions are missing from the TBTB 10, the TBTB 10 assumes a prediction of, for example, Not Trace Leave. FIG. 5 illustrates these possible combinations of the computed prediction and the build prediction along with exemplary resulting Trace Leave/Not Trace Leave predictions.

Figure 6:
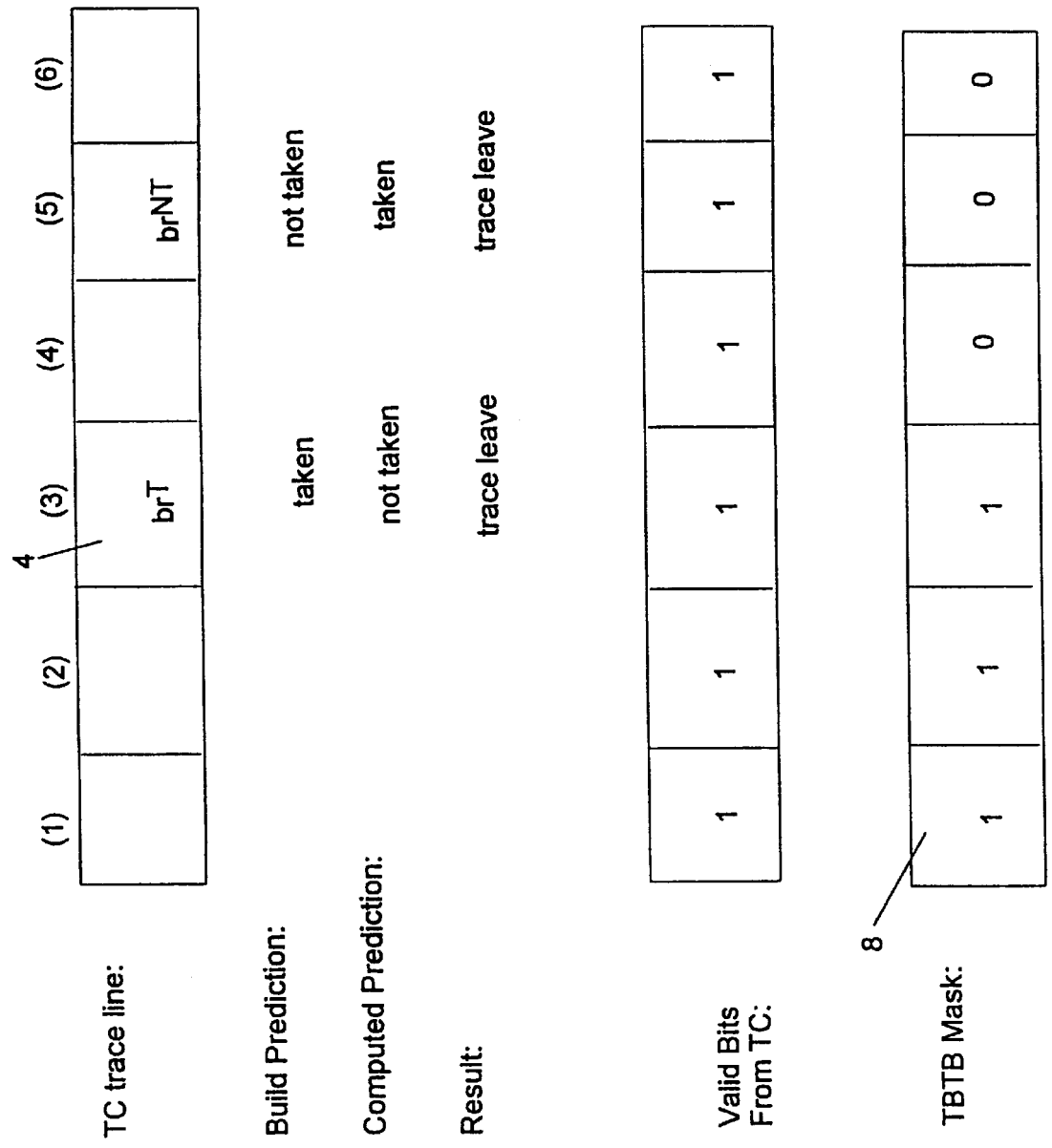
FIG. 6 is a schematic view of an embodiment of a mask according to the present invention.

FIG. 6 outlines another feature of an embodiment of the present invention. When a Trace Leave is predicted, the TBTB 10 sends, for example, a mask 8 to the processor to invalidate any micro-ops of the trace line which follow the branch 4 for which Trace Leave was predicted. A trace line of FIG. 6 contains, for example, six micro-ops designated (1)–(6). As can be seen from FIG. 6, the trace line contains branches 4 in micro-op (3) and micro-op (5). The branch 4 contained in micro-op (3) is stored, for example, in the taken state, while the branch 4 in micro-op (5) is stored, for example, in the not taken state. Accordingly, following the TBTB 10 build process described above, the build prediction for the branch 4 in micro-op (3) is the taken prediction, and the build prediction for the branch 4 in micro-op (5) is the not taken prediction. These build predictions may be stored in the TBTB 10 when, for example, an associated TBTB entry is built and stored in the TBTB 10.

For purposes of example, it can be assumed that TBTB entries for these micro-ops exist and that the computed predictions for each branch 4 in the trace line of FIG. 6 do not match the build prediction for each of the branches 4. In this case, a Trace Leave will be predicted for each branch 4 contained in the trace line. The first of these Trace Leave predictions occurs in micro-op (3) of the trace line. Thus according to the TBTB 10 prediction, the processor should leave the trace 5 and therefore not continue to execute those micro-ops following micro-op (3) in the trace line shown in FIG. 6. These micro-ops have been invalidated by the Trace Leave predictor. As will be described below, the TBTB 10 sends, for example, a mask to the processor to cancel the micro-ops following the trace leaving branch in micro-op (3).

In FIG. 6, in order to illustrate the effects of a Trace Leave and the resulting mask 8, valid micro-ops (i.e., those micro-ops that the processor should execute) are represented by ones. Invalid micro-ops, those that the processor should not execute, are represented by zeros. It can be understood that absent the prediction of a Trace Leave by the TBTB 10, the processor would execute, for example, all of the micro-ops in the trace line 3. In other words, unless a Trace Leave is predicted for a branch 4 of the trace line 3, the processor should execute all of the micro-ops in the trace line 3. Accordingly, all micro-ops of the trace line would be valid, and so each micro-op is designated, for example, with a 1 in the first symbolic array 6 illustrated in FIG. 6.

However, because the trace line 3 of FIG. 6 contains, for example, a Trace Leave at micro-op (3), micro-ops (4), (5), and (6) should not be executed. The presumed set of valid micro-ops incorrectly includes bits following the Trace Leave. To correct this inaccuracy, the TBTB 10 sends a mask 8 to the processor invalidating those bits which follow the first Trace Leave prediction in the trace line. In FIG. 6, this mask 8 therefore contains three valid micro-ops shown as ones, which are for example identical to micro-ops (1), (2) and (3), and three invalid, unexecuted micro-ops shown as zeroes.

In an exemplary embodiment, when the TBTB 10 receives more than one TBTB entry for a selected trace line, the TBTB 10 computes a Trace Leave/Not Trace Leave for each entry concurrently. If more than one Trace Leave is predicted, the TBTB 10 may, for example, order the micro-ops corresponding to the entries (in other words, order the Trace Leaves) to determine a first Trace Leave. The mask 8 may therefore, invalidate, for example, any micro-ops following the first Trace leave, even those micro-ops for which other Trace Leaves are computed. This ordering may be performed when there are only two TBTB entries for the selected Trace Line, which is a constraint in an exemplary embodiment of the present invention, or where there are an even greater number of TBTB entries corresponding to the selected trace line.

FIGS. 7–10 outline an exemplary method according to the present invention. The exemplary method is outlined in conjunction with the system of FIGS. 1–6, and it is assumed for purposes of example that at least one TBTB entry exists for each trace line 7. The method starts at the top of FIG. 7 in step 101, in which the TBTB 10 reads a TBTB entry according to a trace line of the trace cache 1. As noted above, the trace line contains up to six micro-ops. In addition, as noted above, step 101 is performed one clock cycle in advance of reading the trace line to the processor, with the exception of the first line 7 of each trace 5. If the trace line is the first line 7 of a trace 5, then the first line 7 is read to the processor at the same time that the TBTB 10 reads the TBTB entry corresponding to the first line 7.

Once the TBTB entry associated with trace 5 has been read to the TBTB 10, a taken/not taken prediction may be computed (step 105). Again, the algorithm for computing the taken/not taken prediction may be any known algorithm used for branch prediction. Next, the computed taken/not taken prediction may be compared to the build prediction of taken/not taken. This comparison provides, for example, the Trace Leave/Not Trace Leave prediction (step 107).

Figure 8:
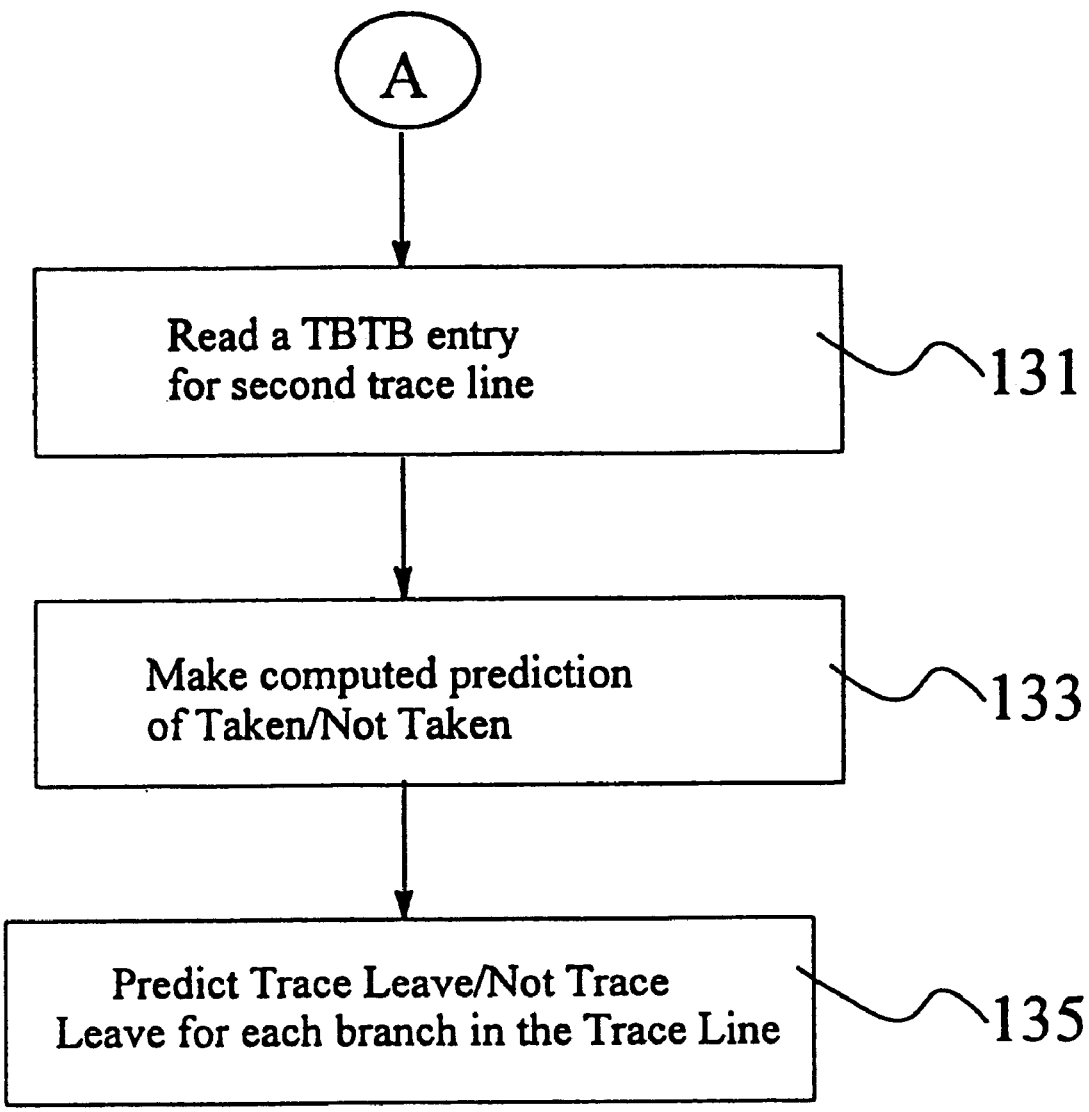
Figure 9:
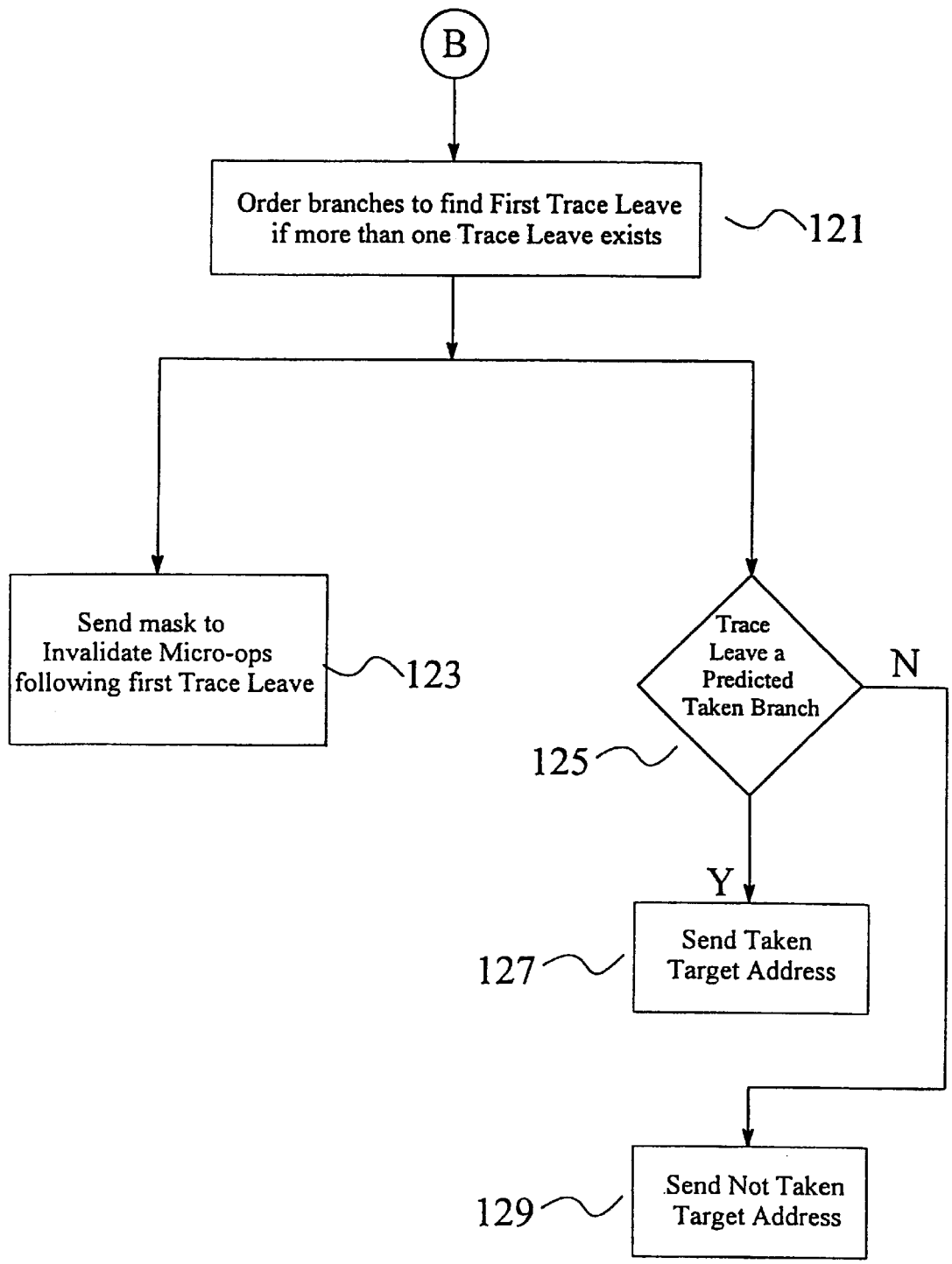

If no Trace Leave is predicted for any branch 4 of the trace line, then the method, for example, essentially repeats itself as shown in FIG. 8. The TBTB entry for the next sequential trace line (i.e., a second trace line) is read to the TBTB 10 (step 131), and the TBTB 10 makes a computed prediction using the TBTB entry (step 133). Then, by comparing computed and build productions, the TBTB 10 predicts Trace Leave or Not Trace Leave for each branch 4 in the trace line (step 135). If no information exists in the TBTB 10 regarding a particular branch 4 of the trace line, then a Not Trace Leave is assumed for that branch 4.

Figure 7:
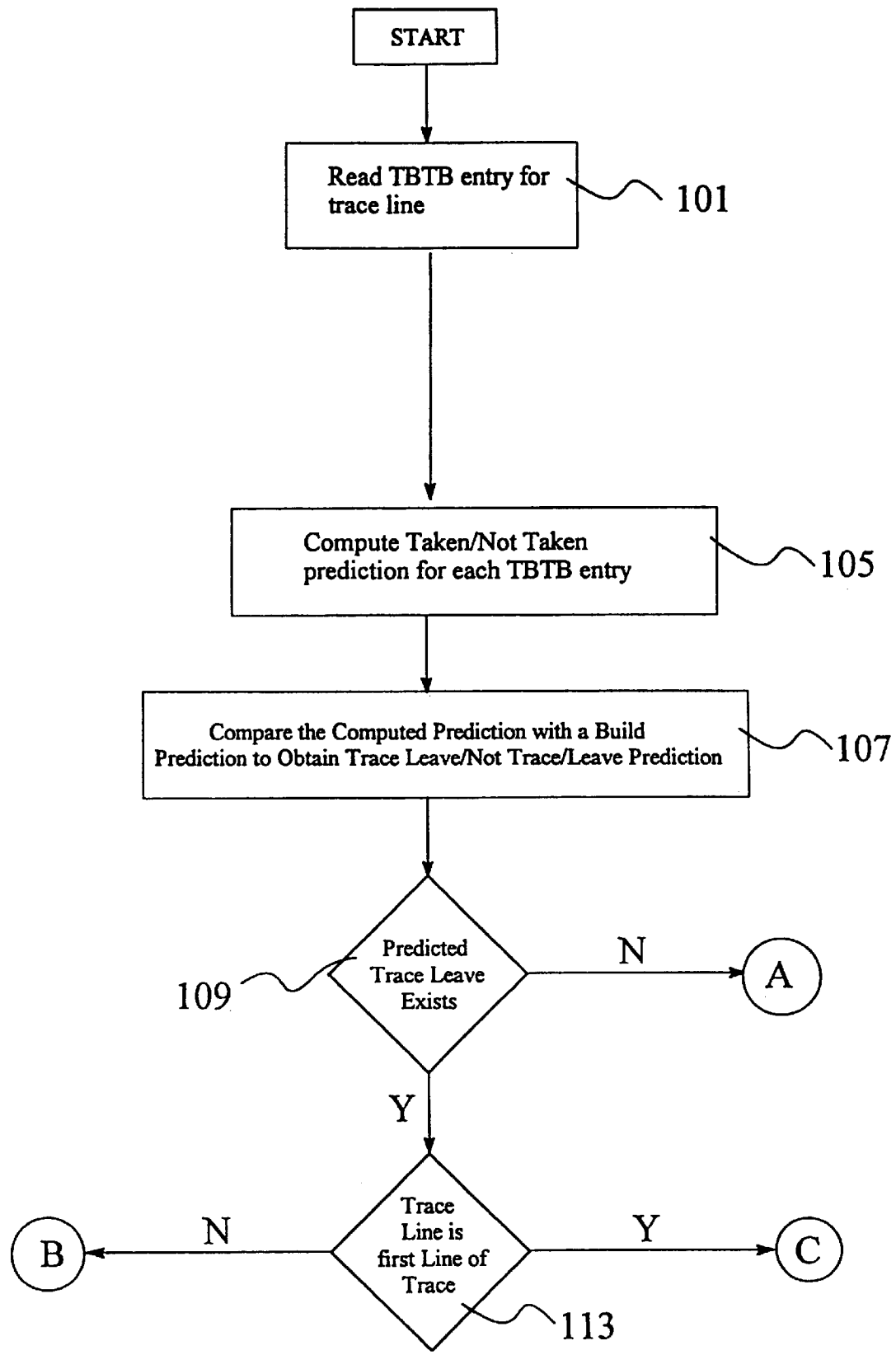
FIGS. 7–10 are flow diagrams illustrating an embodiment of a method of branch prediction according to the present invention.

Returning to step 109 on FIG. 7, if a predicted Trace Leave does exist for the initial trace line, then, for example, a different sequence of steps is performed. This sequence of steps itself varies depending on whether the initial trace line is the first line 7 of a trace 5 or instead part of the body of a trace 5. The latter situation is shown, for example, in FIG. 9, which outlines the steps taken when the trace line is not the first line 7 of a trace 5.

If more than one Trace Leave is predicted for the branches 4 contained in a single trace line, the system must first order the branches 4 to find the first predicted Trace Leave (step 121). It can be understood that the TBTB 10, for example, executes the Trace Leave/Not Trace Leave prediction for each branch 4 concurrently. Thus, the results of the prediction do not have a particular order (i.e., the TBTB 10 has not yet determined which Trace Leave appears first in the trace line). Thus, the TBTB 10 must order the branches 4 contained in the trace line to determine which Trace Leave appears first in the trace line. This is achieved, for example, by comparing the locations of the branches 4 within the trace line. Specifically, that part of the address which indicates how far the micro-op is from the trace head 11 can be used to determine which branch 4 appears first in the trace line. As noted above, this information may be stored in the TBTB 10 as part of the TBTB entry. With respect to FIG. 6, for example, micro-ops (3) and (5) would be ordered to determine that the first Trace Leave occurs in micro-op (3).

Once the first Trace Leave has been determined, the TBTB 10, for example, may send a mask 8 to the processor to invalidate those micro-ops following the first Trace Leave (step 123). In addition, a target address may be sent, for example, to the trace cache 1. The target address sent is dependent, for example, upon the computed taken/not taken prediction. If the computed prediction was a taken prediction, then the TBTB 10 may send a "taken target address" to the trace cache 1 (step 127). On the other hand, if the computed prediction was a not taken prediction, then a "not taken target address" may be sent to the trace cache 1 (step 129).

The exemplary method differs, for example, when trace line read to the TBTB which contains a Trace Leave is the first line of a trace. It can be understood from above that in the exemplary embodiment the TBTB 10 normally reads each TBTB entry, for example, a clock cycle before the trace cache 1 reads out the corresponding trace line to the processor. This sequence is not possible, however, when the corresponding trace line happens to be the first line 7 of a trace 5. Instead, the TBTB 10 must read the TBTB entry for the first line 7 of a trace 5 during the same clock cycle that the first line 7 is read to the processor. Accordingly, when the trace cache begins reading a first line 7 of a trace 5, the TBTB 10 cannot make a prediction on the first line 7 before the trace cache 1 in a timely fashion.

Figure 10:
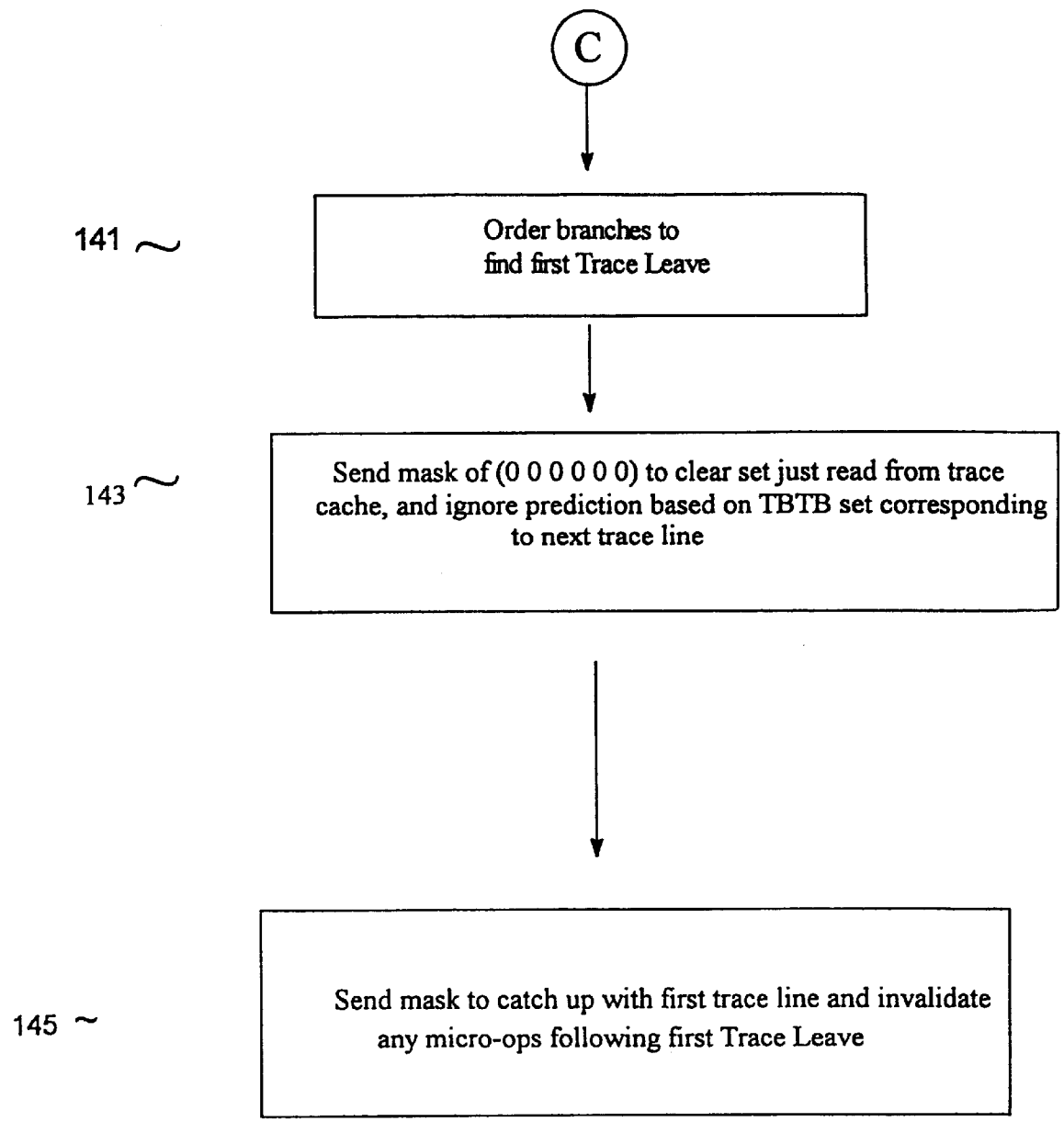

As shown in FIG. 10, the system therefore performs a different series of steps than outlined above when the trace line is a first line 7 of a trace 5. In an embodiment of the present method, the TBTB 10 makes its Trace Leave/Not Trace Leave prediction and orders any branches to find the first Trace Leave (step 141). Next, the TBTB 10 sends a mask 8 to invalidate all micro-ops of the second line of the trace, which was read to the processor, for example, as the TBTB 10 completed its prediction on the first line of the trace. At the same time, the TBTB 10 ignores, for example, any predictions based upon the next sequential trace line (step 143). Finally, the TBTB 10 sends an additional mask 8 to "catch up" with the first trace line and invalidate any micro-ops following the first Trace Leave (step 145).

Figure 11:
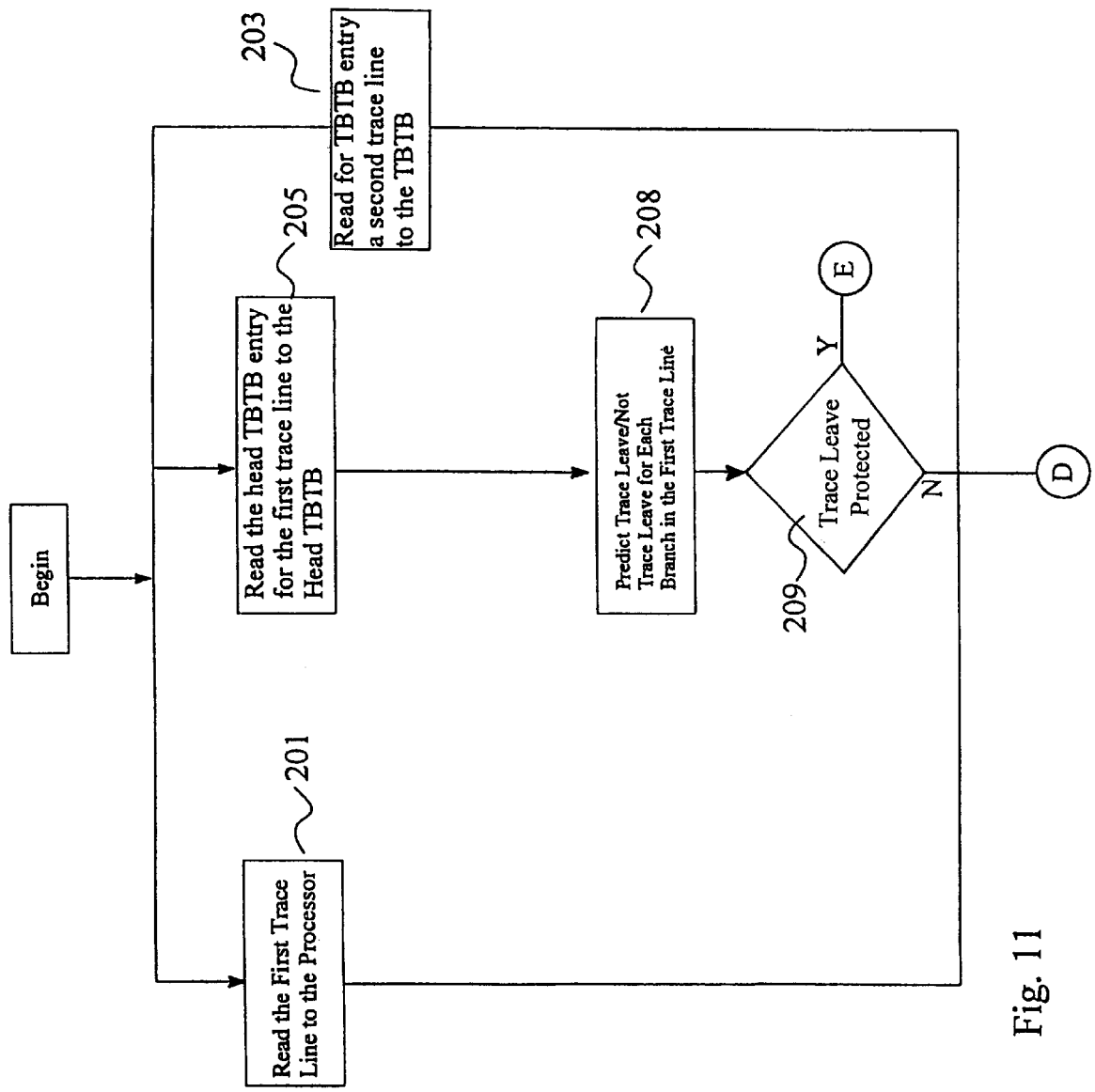
FIGS. 11–12 are flow diagrams illustrating a second embodiment of a method of branch prediction according to the present invention.
Figure 12:
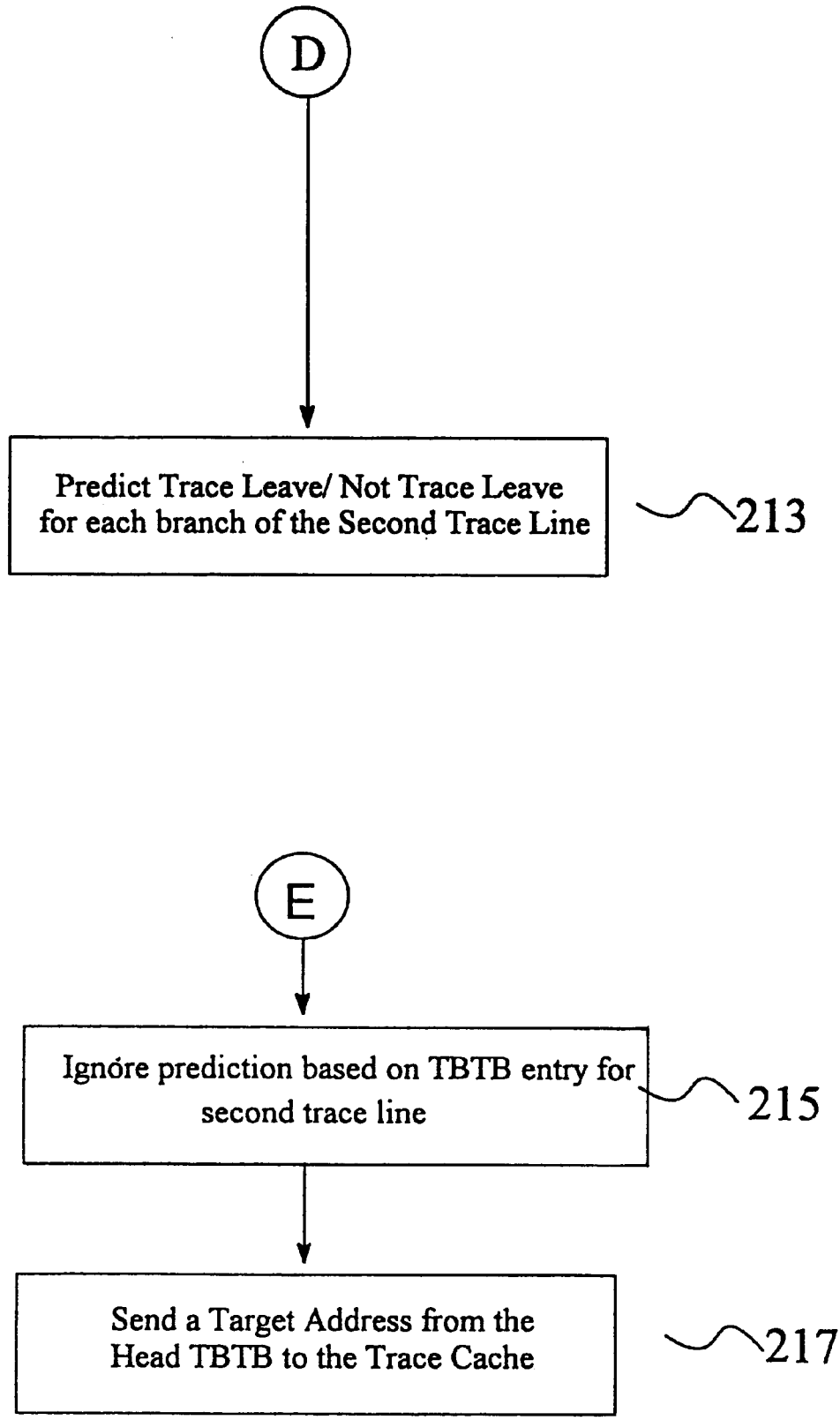

FIGS. 11 and 12 outline another exemplary method according to the present invention for making predictions on the first line 7 of a trace 5. This exemplary method employs, for example, a head TBTB 16 as shown in FIG. 1. The head TBTB 16 is responsible, for example, for making predictions on the first line 7 of a trace 5. Because the head TBTB 16 is, for example, smaller than the TBTB 10, its contents ("head TBTB entries") may be accessed more quickly.

Moreover, in an exemplary embodiment the Trace Leave/Not Trace Leave prediction for any entry of the head TBTB 16 may be made as the entry is built, rather than when the corresponding trace line is later read to the processor. This allows a quicker response from the head TBTB 16 during the reading of the first line 7 of a trace 5. In addition, the head TBTB 16 uses, for example, a simpler branch prediction algorithm so that the Trace Leave/Not Trace Leave prediction may be computed as the entry is built. These exemplary features or other suitable features allow the head TBTB 16 to make a Trace Leave/Not Trace Leave prediction and ship a target address within the time that it takes to access the first line 7 of a trace 5, for example within one clock cycle.

An exemplary head TBTB 16 functions as follows. When the trace cache 1 reads out a first line 7 of a trace 5 to a processor, the head TBTB 16 may, during the same clock cycle, read an associated TBTB entry. The head TBTB 16 may make branch predictions (e.g. read out the existing Trace Leave/Not Trace Leave prediction) on that first line 7 of the trace 5 and ship the output to the trace cache 1 within, for example, one clock cycle. Thus, if a Trace Leave is predicted for the first line 7 of a trace 5, the prediction will be available to the trace cache 1 before it begins to read the next line of the trace.

Referring to FIG. 11, as the first line 7 of a trace 5 is read to the processor (step 201) and the TBTB 10 reads the TBTB entry for the second line of the trace 5 (step 203), the head TBTB 16 reads the head TBTB entry corresponding to the first line 7 of the trace 5 (step 205). In addition, within the same clock cycle, the head TBTB 16 predicts a Trace Leave or Not Trace Leave for each branch 4 existing in the first line 7 of the trace 5 (step 208).

If in step 209 a Trace Leave is predicted, then the head TBTB 16 clears the second trace line from the TBTB data path 12. In addition, the head TBTB 16 sends a target address to the trace cache 1. The target address directs the trace cache 1 to a new trace 5.

If a Not Trace Leave is predicted for the first line 7 of a trace 5, then the TBTB data path 12 continues its prediction on the second line of the trace 5 as shown in FIG. 12. Specifically, the TBTB data path 12 predicts a Trace Leave or Not Trace Leave for each branch 4 existing in the second trace line (step 213). The method of FIGS. 11–12 may, for example, be used in conjunction with the method outlined above or with other methods.

It may also be understood that the TBTB 10 or head TBTB 16 may make an erroneous prediction of Trace Leave. This may occur, for example, as a result of the differing allocation mechanisms for the trace cache 1 and the TBTB 10 and head TBTB 16. In order to recognize and correct this error, the trace cache unit may first check for certain mispredictions, including making a prediction on a non-branching micro-op, predicting a "not taken" on an unconditional branch, and shipping an erroneous target. If such an error is detected, the TBTB 10 according to an exemplary embodiment invalidates any micro-ops in the pipeline to the processor and corrects the data in the TBTB 10 leading to the misprediction.

The cache index and method according to the present invention have been described with respect to several exemplary embodiments. It can be understood, however, that there are many other variations of the above described embodiments which will be apparent to those skilled in the art. It is understood that these modifications are within the teaching of the present invention which is to be limited only by the claims appended hereto.

What is claimed is:

1. A branch target buffer for a trace cache, comprising:
   a target buffer array, the target buffer array storing a plurality of TBTB entries; and
   a target buffer data path, the target buffer data path receiving one of the TBTB entries, the one of the TBTB entries corresponding to at least one micro-op contained in the trace cache and containing information about a branch in the at least one micro-op, the buffer data path using the TBTB entry to predict one of a Trace Leave and a Not Trace Leave for the branch.

2. The branch target buffer according to claim 1, further comprising a head target buffer, the head target buffer receiving a head TBTB entry corresponding to a first line of a trace and predicting one of the Trace Leave and the Not Trace Leave for the first line of a trace using the head TBTB entry.

3. The branch target buffer according to claim 2, wherein the head target buffer both receives the head TBTB entry and predicts one of the Trace Leave and the Not Trace Leave in an amount of time less than an amount of time required to access the trace cache.

4. The branch target buffer according to claim 2, wherein when one of the target buffer data path and the head target buffer predicts the Trace Leave, one of the target buffer data path and the head target buffer sends a target address to the target buffer array.

5. A trace cache unit, comprising:
   a trace cache array adapted to store instruction traces, each of the instruction traces organized into at least one trace line, each of the trace lines including at least one micro-op; and
   a trace branch target buffer, the trace branch target buffer including:
      a buffer array, the buffer array storing a plurality of TBTB entries, the TBTB entries being indexed according to the micro-ops of the trace lines; and
      a buffer data path, the buffer data path receiving a first TBTB entry, the first TBTB entry corresponding to a first micro-op of a selected trace line and containing information about a branch of the first micro-op, the buffer data path using the first TBTB entry to predict one of a Trace Leave and a Not Trace Leave for the first micro-op.

6. The trace cache unit according to claim 5, the buffer data path receiving a plurality of TBTB entries corresponding to a plurality of branching micro-ops of the selected trace line and containing information about branches of the branching micro-ops, the plurality of TBTB entries including the first TBTB entry and the plurality of micro-ops including the first micro-op, the buffer data path using the plurality of TBTB entries to predict one of the Trace Leave and the Not Trace Leave for each of the branching micro-ops;
   wherein when the buffer data path predicts the Trace leave for at least two of the branching micro-ops, the buffer data path orders the branching micro-ops to determine a first Trace Leave.

7. The trace cache unit according to claim 5, wherein the trace branch target buffer further includes a head trace branch target buffer, the head trace branch target buffer receiving a head TBTB entry corresponding to a first line of a trace and predicting one of a Trace Leave and a Not Trace Leave for the first line of a trace using the head TBTB entry.

8. The trace cache unit according to claim 7, wherein the head trace branch target buffer, in an amount of time less than an amount of time required to access the trace cache, receives the head TBTB entry and predicts one of the Trace Leave and the Not Trace Leave.

9. The trace cache unit according to claim 7, wherein when one of the buffer data path and the head trace branch target buffer predicts a Trace Leave, one of the buffer data path and the head trace branch target buffer sends a target address to the trace cache array.

10. A method for branch prediction in a trace cache, the trace cache storing traces of micro-ops, the traces organized into trace lines, each of the trace lines containing at least one micro-op, the trace cache connected to a trace branch target buffer containing a buffer array, the buffer array storing a plurality of TBTB entries corresponding to the micro-ops, comprising the steps of:
   looking up a first TBTB entry corresponding to a first branching micro-op of a selected trace line; and
   predicting one of a Trace Leave and a Not Trace Leave for the first branching micro-op using the first TBTB entry.

11. The method according to claim 10, further comprising, when the Trace Leave is predicted, the steps of:
   sending a mask to the trace cache to invalidate any micro-ops of the selected trace line located after the first branching micro-op; and
   sending a target address to the trace cache.

12. The method according to claim 10, further comprising the steps of:
   looking up a second TBTB entry corresponding to a second branching micro-op of the selected trace line; and
   predicting one of the Trace Leave and the Not Trace Leave for the second branching micro-op using the second TBTB entry, wherein the above two steps are performed while the steps of looking up and predicting on the first branching micro-op are performed; and
   ordering the first and second branching micro-ops when the Trace Leave is predicted for the first and second branching micro-ops to determine a first Trace Leave predicted micro-op, the first Trace Leave predicted micro-op being one of the first and second branching micro-ops.

13. The method according to claim 12, further comprising the steps of:
   sending a mask to the trace cache to invalidate any micro-ops of the selected trace line located after the first Trace Leave predicted micro-op; and
   sending a target address to the trace cache.

14. The method according to claim 10, the TBTB entries including build predictions, each of the build predictions being one of a taken prediction and a not taken prediction, wherein the step of predicting one of a Trace Leave and a Not Trace Leave includes the substeps of:
   making a computed prediction on the first branching micro-op, the computed prediction being one of the taken prediction and the not taken prediction;
   comparing the computed prediction with the build prediction of the first branching micro-op; and
   predicting a Trace Leave when the computed prediction does not match the build prediction and a Not Trace Leave when the computed prediction matches the build prediction; and
wherein the step of sending a target address to the trace cache includes sending a taken target address when the computed prediction is the taken prediction and sending a not taken target address when the computed prediction is a not taken prediction.

15. The method according to claim 10, the selected trace line including a trace head, further comprising, when the Trace Leave is predicted for the first branching micro-op, the steps of:

clearing a next consecutive trace line from a pipeline to the processor; and ignoring any predictions made based on any TBTB entries corresponding to the next consecutive trace line.

16. A method for branch prediction in a trace cache, the trace cache connected to a trace branch target buffer, the trace cache storing traces, the traces organized into trace lines of micro-ops, comprising the steps of:

(a) reading a leading trace line from the trace cache to a processor;

(b) reading a first following trace line from the trace cache to the processor, the leading trace line and the first following trace line being stored sequentially in the trace cache; and the following steps, which are performed while steps (a) and (b) are performed:

(c) reading any TBTB entries corresponding to the first following trace line to the trace branch target buffer; and (d) predicting one of a Trace Leave and a Not Trace Leave for any branch of the first following trace line.

17. The method according to claim 16, further comprising, when the Not Trace Leave is predicted for the first following trace line, the steps of:

(e) reading a second following trace line from the trace cache to the processor; and the following steps, which are performed while steps (b) and (e) are performed:

(f) reading any TBTB entries corresponding to the second following trace line to the trace branch target buffer, the first following trace line and the second following trace line being stored sequentially in the trace cache; and (g) predicting one of the Trace Leave and the Not Trace Leave for any branch of the second following trace line.

18. The method according to claim 16, further comprising, when the Trace Leave is predicted for a branching micro-op of the first following trace line, the following steps:

(e) sending a mask from the trace branch target buffer to the processor to invalidate any micro-ops of the first following trace line that are stored after the branching micro-op; and (f) sending a target address from the trace branch target buffer to the trace cache.

19. The method according to claim 18, wherein step (d) includes the substeps of:

(1) making a computed prediction on the branch, the computed prediction being one of a taken prediction and a not taken prediction;

(2) comparing the computed prediction with a historical prediction of the branch, the historical prediction being one of the taken prediction and the not taken prediction; and (3) predicting a Trace Leave when the computed prediction does not match the historical prediction and a Not Trace Leave when the computed prediction matches the historical prediction; and wherein step (f) includes sending a taken target address when the computed prediction is the taken prediction and sending a not taken target address when the computed prediction is the not taken prediction.

20. The method according to claim 16, the leading trace line including a trace head, further comprising the following steps, which are performed while steps (a) and (b) are performed:

(e) reading any TBTB entries corresponding to the leading trace line to the trace branch target buffer; and (f) predicting one of the Trace Leave and the Not Trace Leave for any branch of the leading trace line.

21. The method according to claim 20, further comprising, when the Trace Leave is predicted for any branch of the leading trace line, the steps of:

(g) sending a mask from the trace branch target buffer to the processor to invalidate all micro-ops of the first following trace line; and (h) sending a mask from the trace branch target buffer to the processor to invalidate any micro-ops following a last branching micro-op of the leading trace line.

22. The method according to claim 16, further comprising the steps of:

(e) recognizing whether the first following trace line is a last line of a trace; and (f) predicting a Trace End when the first following trace line is the last line of a trace.

23. The method according to claim 22, further comprising the steps of:

(g) predicting a target address for a new trace when the first following trace line is the last line of a trace; and (i) sending the target address to the trace cache.

24. A method for branch prediction in a trace cache, the trace cache connected to a trace branch target buffer, the trace cache storing traces, the traces organized into trace lines containing micro-ops, the trace branch target buffer including a head trace branch target buffer, comprising the steps of:

(a) reading a leading trace line from the trace cache to a processor;

(b) the following steps, which are performed while step (a) is performed:

(1) reading any head TBTB entries corresponding to the leading trace line to the head trace branch target buffer; and (2) predicting one of a Trace Leave and a Not Trace Leave for any branch of the leading trace line using the head TBTB entry.

25. The method according to claim 24, further comprising the steps of:

(c) reading any TBTB entries corresponding to a first following trace line to the trace branch target buffer while step (a) is performed; and when the Not Trace Leave is predicted for each branch of the leading trace line, the following steps:

(d) reading the first following trace line to the processor; and (e) predicting one of the Trace Leave and the Not Trace Leave for any branch of the first following trace line.

26. The method according to claim 24, further comprising the steps of:

(c) reading any TBTB entries corresponding to a first following trace line to the trace branch target buffer while step (a) is performed; and when the Trace Leave is predicted for any branch of the leading trace line, the following steps:

(d) ignoring any predictions based on TBTB entries corresponding to the first following trace line; and (e) sending a target address from the trace branch target buffer to the trace cache.

* * * * *